(12) United States Patent
Choi et al.

(10) Patent No.: US 10,656,882 B2
(45) Date of Patent: May 19, 2020

(54) IMAGE FORMING DEVICE TO DETERMINE WARM-UP TIME

(71) Applicant: HEWLETT-PACKARD DEVELOPMENT COMPANY, L.P., Spring, TX (US)

(72) Inventors: Mi-kyung Choi, Suwon-si (KR); Woo-chul Shin, Suwon-si (KR); Jun-young Choi, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/422,571

(22) Filed: May 24, 2019

(65) Prior Publication Data

US 2019/0278535 A1    Sep. 12, 2019

Related U.S. Application Data

(63) Continuation of application No. PCT/KR2017/006432, filed on Jun. 20, 2017.

(30) Foreign Application Priority Data

Nov. 30, 2016    (KR) .................. 10-2016-0162290

(51) Int. Cl.
*G06F 15/00* (2006.01)
*G06F 3/12* (2006.01)
*G06K 1/00* (2006.01)

(52) U.S. Cl.
CPC .............. *G06F 3/1213* (2013.01); *G06F 3/12* (2013.01); *G06F 3/1215* (2013.01); *G06F 3/1217* (2013.01); *G06F 3/1259* (2013.01)

(58) Field of Classification Search
CPC ........ G06F 3/1213; G06F 3/12; G06F 3/1215; G06F 3/1217; G06F 3/1259
(Continued)

(56) References Cited

U.S. PATENT DOCUMENTS 8,502,994 B2 * 8/2013 Lee .................... G03G 15/5025
358/1.13
2003/0025935 A1    2/2003 Somei
(Continued)

FOREIGN PATENT DOCUMENTS

| JP | 2006251363 | 9/2006 |
| KR | 1020050068002 | 7/2005 |
| KR | 1020130011120 | 1/2013 |

*Primary Examiner* — Douglas Q Tran
(74) *Attorney, Agent, or Firm* — Staas & Halsey LLP (57) ABSTRACT

An image forming device includes a communication unit to transmit data to and receive data from an external device, an image forming job unit to perform printing, and a controller to control warming up of the image forming job unit to perform the printing, such that the image forming job unit performs the printing after the warming up is completed. The controller is to receive a print execution request to perform the printing and a predicted value of a print preparation time for the image forming device to create output image data, to perform the printing, from the external device via the communication unit, determine a warm-up start time of when to start the warming up of the image forming job unit by using the received predicted value of the print preparation time, and control the image forming job unit to start the warming up at the determined warm-up start time.

15 Claims, 10 Drawing Sheets

(58) Field of Classification Search
USPC .............................. 358/1.1, 1.13, 1.14, 1.15
See application file for complete search history.

(56) References Cited

U.S. PATENT DOCUMENTS

2007/0242301 A1* 10/2007 Tsuchie ................ H04N 1/4406
358/1.14
2010/0073725 A1 3/2010 Tian

* cited by examiner

IMAGE FORMING DEVICE TO DETERMINE WARM-UP TIME

CROSS-REFERENCE TO RELATED APPLICATIONS

This application is a continuation application of PCT international patent application no. PCT/KR2017/006432, filed on Jun. 20, 2017, which claims priority from Korean Patent Application No. 10-2016-0162290, filed on Nov. 30, 2016 in the Korean Intellectual Property Office, the content of each of the foregoing is incorporated herein by reference.

BACKGROUND

When a user inputs a print command to an external device connected to an image forming device, the external device generates output data and transmits the output data to the image forming device. The image forming device receives the output data, and creates an output image to perform printing, based on the output data. In this case, printing may be performed by completing creation of at least one page of the output image.

When a controller of the image forming device transmits a driving signal to an engine or an image forming job unit of the image forming device, the engine is driven to warm up the image forming device, and the image forming device performs printing after the warming up is completed. In this case, in order to prevent a delay in printing due to a warm-up time of the image forming device, a method of transmitting the driving signal to the engine of the image forming device as soon as a user inputs the print command is used. This method is referred to as an early warm-up.

DETAILED DESCRIPTION

When an early warm-up technique is used, warming up of the image forming device may be completed early, and thus printing may be performed as soon as the image forming device completes creation of a first page of an output image. However, idling of the engine or image forming job unit of the image forming device occurs for a certain time period until the image forming device completes the creation of the first page of the output image after the early warming up of the image forming device is completed. The idling of the engine may decrease the lifespan of the engine, and thus, measures for minimizing an idle time of the engine are needed. Various examples are directed to an image forming device capable of minimizing an idle time thereof by minimizing the difference between a point of time when warming up of the image forming device is completed and a point of time when the image forming device completes creation of a first page of an output image; an electronic device; and an operating method thereof.

Throughout the specification, parts overlapping in the following descriptions are not redundantly described for the sake of brevity.

It will be understood that when an element is referred to as being "connected to" another element, the element can be directly on another element or intervening elements or can be "electrically connected to" another element. It will be further understood that when an element "includes" another element, the element should be understood to include not only another element but also other elements unless otherwise mentioned.

As used herein, the term "image forming job" may refer to forming an image or various jobs related to an image (e.g., printing, scanning or faxing), such as creation, storing or transmission of an image file, and the term "job" may refer to not only the image forming job but also a series of processes needed to perform the image forming job.

The term "image forming device" may refer to various devices, e.g., a printer, a scanner, a fax machine, and a multi-function printer (MFP), and a display device, which are capable of performing the image forming job.

The term "content" may refer to various types of data, such as a photograph, an image, and a document file, which may be targets of the image forming job.

The term "scan file" may refer to a file obtained by scanning an image by a scanner.

The term "user" may refer to a person who performs an operation related to the image forming job by using the image forming device or a device connected to the image forming device via a wire or wirelessly. The term "manager" may refer to a person who has authority to access all functions of the image forming device and the system. The terms "manager" and "user" may refer to the same person.

Examples of a method of controlling a warm-up start time of an image forming device 100 based on data received from an external device will be described below. In detail, according to the following examples, the image forming device 100 may receive a print execution request and a predicted value of a print preparation time from an external device, determine a warm-up start time of the image forming device 100 by using the predicted value of the print preparation time, and control warming up thereof to be started at the determined warm-up start time.

Before describing examples in detail, the present disclosure will be described below. The present disclosure will be briefly described with reference to FIG. 3. An example of an operation of an image forming device will be described with reference to FIG. 4. An example of an operation of an external device will be described with reference to FIG. 6. An example of an operation of image forming device will be described in detail with reference to FIG. 5. Examples of an operation between an image forming device and an external device will be described with reference to FIGS. 7 and 8. Examples of structures of an image forming device and an external device will be described with reference to FIGS. 1 and 2. Concrete examples will be described with reference to FIGS. 9 and 10.

Figure 1:
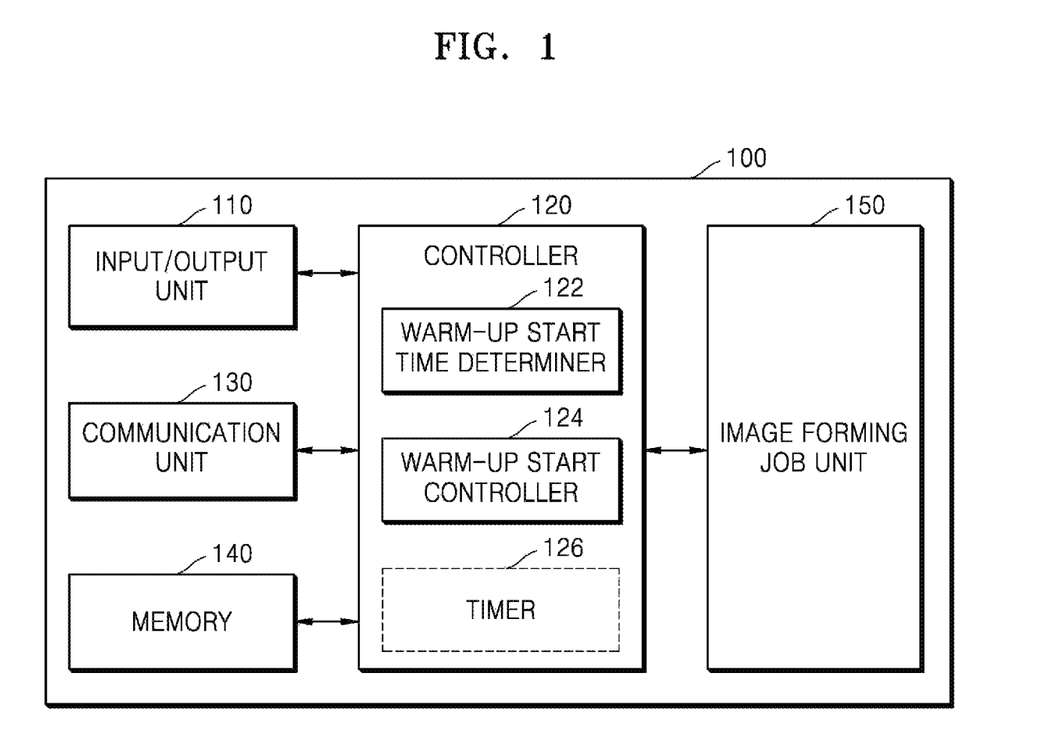
FIG. 1 is a block diagram of an image forming device according to an example.

FIG. 1 is a block diagram of an image forming device according to an example.

Referring to FIG. 1, the image forming device 100 according to an example may include an input/output unit 110, a controller 120, a communication unit 130, a memory 140 and an image forming job unit 150. Although not shown, the image forming device 100 may further include a power supply to supply power to the components thereof.

The input/output unit 110 may include an input unit to receive an input for performing an image forming job from a user, and an output unit to display a result of performing the image forming job or information such as a state of the image forming device 100. For example, the input/output unit 110 may include an operation panel to receive a user input, a display panel to display an image, and the like.

In detail, examples of the input unit may include a various types of devices, such as a keyboard, a physical button, a touch screen, a camera, and a microphone, which are capable of receiving a user input. Examples of the output unit may include a display panel, a speaker, etc. However, examples are not limited thereto, and the input/output unit 110 may include a device supporting various types of inputs or outputs.

The input/output unit 110 of FIG. 1 may include its own control system. That is, the input/output unit 110 may include a control system (a controller, a memory, etc.) for controlling a user interface (UI) provided from the input/output unit 110, separately from the controller 120 of the image forming device 100. Programs such as applications may be installed in the control system of the input/output unit 110 to support an operating system (OS) providing a UI and various functions.

The controller 120 may control overall operations of the image forming device 100, and include a processor such as a central processing unit (CPU). The controller 120 may control other components included in the image forming device 100 to perform an operation corresponding to a user input received via the input/output unit 110.

For example, the controller 120 may execute a program stored in the memory 140, read a file stored in the memory 140, or store a new file in the memory 140.

Although FIG. 1 illustrates that the controller 120 includes a warm-up start time determiner 122, a warm-up start controller 124, and a timer 126, the controller 120 may include some of these components or may further include other components to perform other types of control.

The warm-up start time determiner 122 may determine a point of time when warming up of the image forming device 100 will be started. In one example, the point of time when warming up of the image forming device 100 will be started may refer to a point of time when driving of an engine of the image forming device 100 will be started. Idling of the engine may occur when the image forming device 100 starts warming up early, and a printing process may be delayed when the image forming device 100 starts warming up late. The warm-up start time determiner 122 may contribute to performing printing smoothly and quickly by predicting an optimum warm-up start time.

The warm-up start controller 124 may control the image forming device 100 to start warming up at the warm-up start time of the image forming device 100 determined by the warm-up start time determiner 122. In more detail, the warm-up start controller 124 may control driving of the engine of the image forming device 100 to be started at the warm-up start time of the image forming device 100 determined by the warm-up start time determiner 122.

The timer 126 may be used to obtain a measured value of a print preparation time. As used herein, the term "print preparation time" may refer to a time period for the image forming device 100 to create an output image, based on output data received from an external device 200. In more detail, the print preparation time may be a time period for the image forming device 100 to complete creation of a first page of the output image immediately after the print execution request is received from the external device 200.

The warm-up start time determiner 122, the warm-up start controller 124, and the timer 126 will be described in more detail with reference to FIGS. 3 to 5 below.

The communication unit 130 may establish wired or wireless communication with another device or a network. To this end, the communication unit 130 may include a communication module supporting at least one of various wired/wireless communication methods. For example, the communication module may be in the form of a chipset or may be a sticker/barcode (e.g., a sticker including NFC tag) containing information to establish communication.

Wireless communication may include, for example, at least one among wireless fidelity (Wi-Fi), Wi-Fi direct, Bluetooth, ultra-wide band (UWB), and near-field communication (NFC). Wired communication may include, for example, at least one among USB and high-definition multimedia interface (HDMI). In addition, the communication unit 130 may establish wired or wireless communication with another device or a network by using simple network management protocol (SNMP), hypertext transfer protocol (HTTP), or the like.

Figure 2:
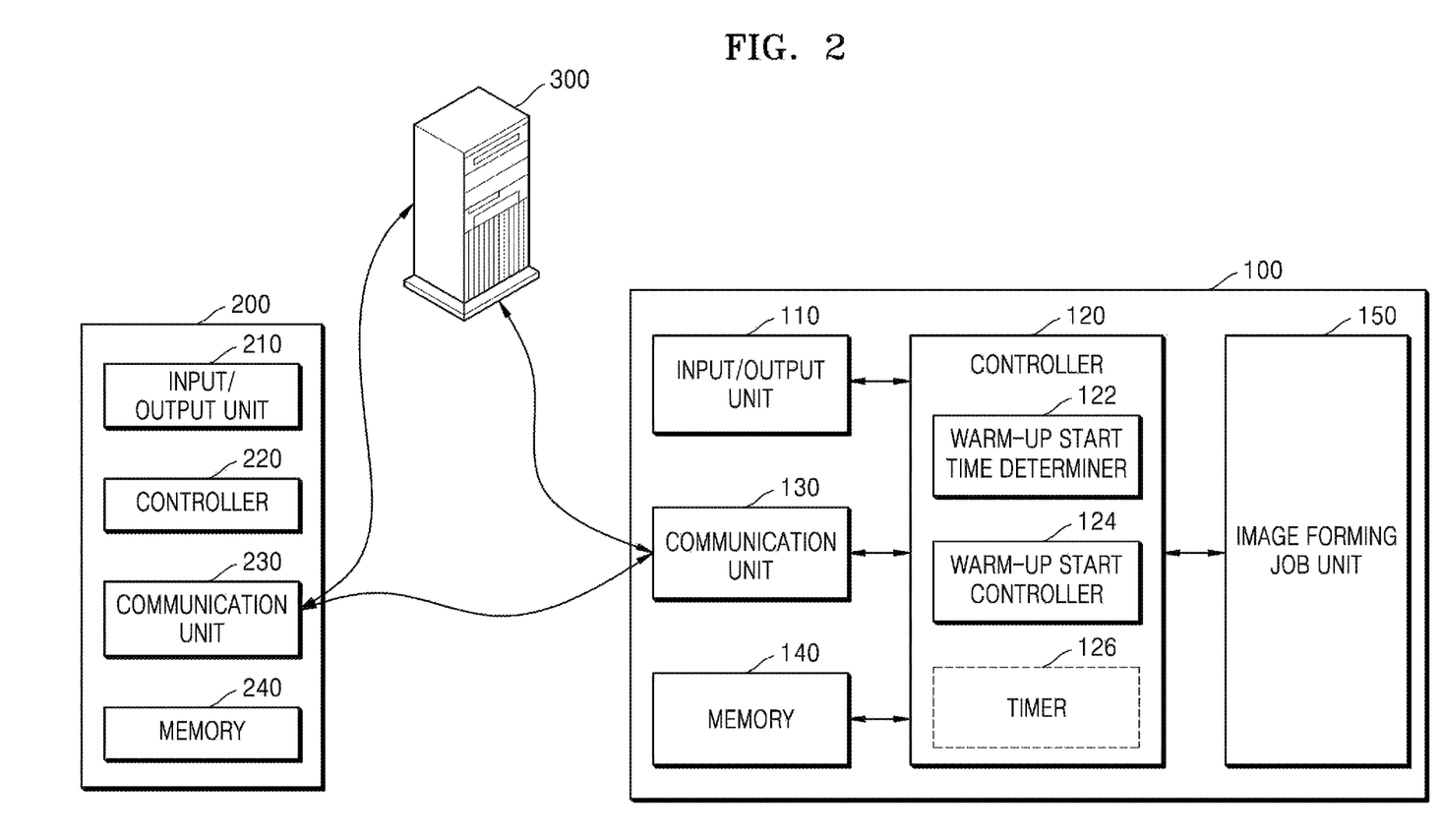
FIG. 2 is a block diagram illustrating the relationship between an image forming device, an external device, and a server, according to an example.

The communication unit 130 may be connected to an external device outside the image forming device 100, and transmit a signal or data to or receive a signal or data from the external device. Referring to FIG. 2, the image forming device 100 is connected to the external device 200 via the communication unit 130. The communication unit 130 may transmit a signal or data received from the external device 200 to the controller 120 or may transmit a signal or data generated by the controller 120 to the external device 200. For example, when the communication unit 130 receives a print command signal and print data from the external device 200, the controller 120 may output the received print data via an image forming job unit 150.

A program such as an application and various types of data such as a file may be installed or stored in memory 140. The controller 120 may access and use the data stored in the memory 140 or may store new data in the memory 140. The controller 120 may execute the program installed in the memory 140. The controller 120 may install an application received from the outside via the communication unit 130 in the memory 140.

The image forming job unit 150 may perform an image forming job such as printing, scanning, or faxing.

FIG. 2 is a block diagram illustrating the relationship among an image forming device, an external device, and a server, according to an example.

As illustrated in FIG. 2, an external device 200 may include an input/output unit 210, a controller 220, a communication unit 230, and a memory 240. The controller 220 may control an image forming job by executing a program stored in the memory 240 and transmitting a signal or data generated as a result of executing the program to the communication unit 230 via the communication unit 230. Examples of the external device 200 may include, but are not limited to, a smart phone, a tablet a personal computer (PC), a home appliance, a medical device, a camera, and a wearable device.

In one example, the communication unit 230 may transmit a predicted value of a print preparation time to the image forming device 100, and receive a measured value of the print preparation time from the image forming device 100.

In one example, the controller 220 may determine a predicated value of a print preparation time of a next print job, based on measured values of print preparation times of previous print jobs stored in the memory 240 and a received measured value of a print preparation time of a current print job.

In one example, the memory 240 may store the received measured value of the print preparation time of the current print job, and the predicated value of the print preparation time of the next print job.

The communication unit 130 may be directly connected to a server 300 to transmit a signal or data to or receive a signal or data from the server 300. The communication unit 130 may be connected to the external device 200 via the server 300. That is, the communication unit 130 of the image forming device 100 may transmit a signal or data to or receive a signal or data from the communication unit 230 of the external device 200 via the server 300.

Figure 3:
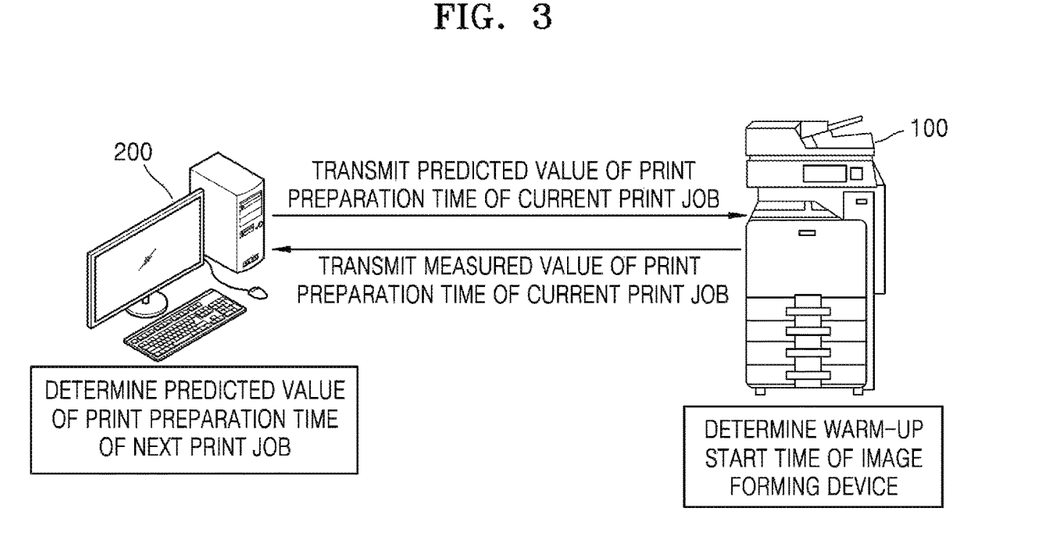
FIG. 3 is a diagram illustrating operations of an image forming device and an external device, according to an example.

FIG. 3 is a diagram illustrating operations of an image forming device and an external device, according to an example.

As illustrated in FIG. 3, an image forming device 100 and an external device 200 may transmit data to or receive data from each other. Examples of the data transmitted or received between the image forming device 100 and the external device 200 may include a predicted value of a print preparation time of a current print job, a measured value of the print preparation time of the current print job, an IP address of the external device 200, job ID of the print job, etc.

As used herein, the term "output data" may refer to data generated in an external device connected to an image forming device to execute a print command, when a user inputs a print command to the external device.

The term "output image" or "output image data" may refer to image data generated by an image forming device to perform a current print job, based on output data received from an external device.

In one example, the external device 200 may determine a predicted value of a print preparation time of a current print job, based on measured values of print preparation times of previous print jobs. The measured values of the print preparation times of the previous print jobs may be obtained by the timer 126 of the image forming device 100. The external device 200 may receive the measured values of the print preparation times of the previous print jobs from the image forming device 100. A method of determining a predicted value of a print preparation time of a print job, the method performed by the external device 200, will be described in detail with reference to FIG. 9 below.

In one example, the external device 200 may transmit the predicted value of the print preparation time of the current print job to the image forming device 100.

In one example, the image forming device 100 may determine a warm-up start time, based on the received predicted value of the print preparation time of the current print job.

In one example, the image forming device 100 may measure a value of the print preparation time of the current print job, and transmit the measured value of the print preparation time of the current print job to the external device 200.

In one example, the external device 200 may determine a predicted value of a print preparation time of a next print job, based on the received measured value of the print preparation time of the current print job. The determined predicted value of the print preparation time of the next print job may be transmitted when the external device 200 transmits a print execution request for the next print job to the image forming device 100. The image forming device 100 may use the predicted value of the print preparation time of the next print job, which is received from the external device 200, when the next print job is performed.

Figure 4:
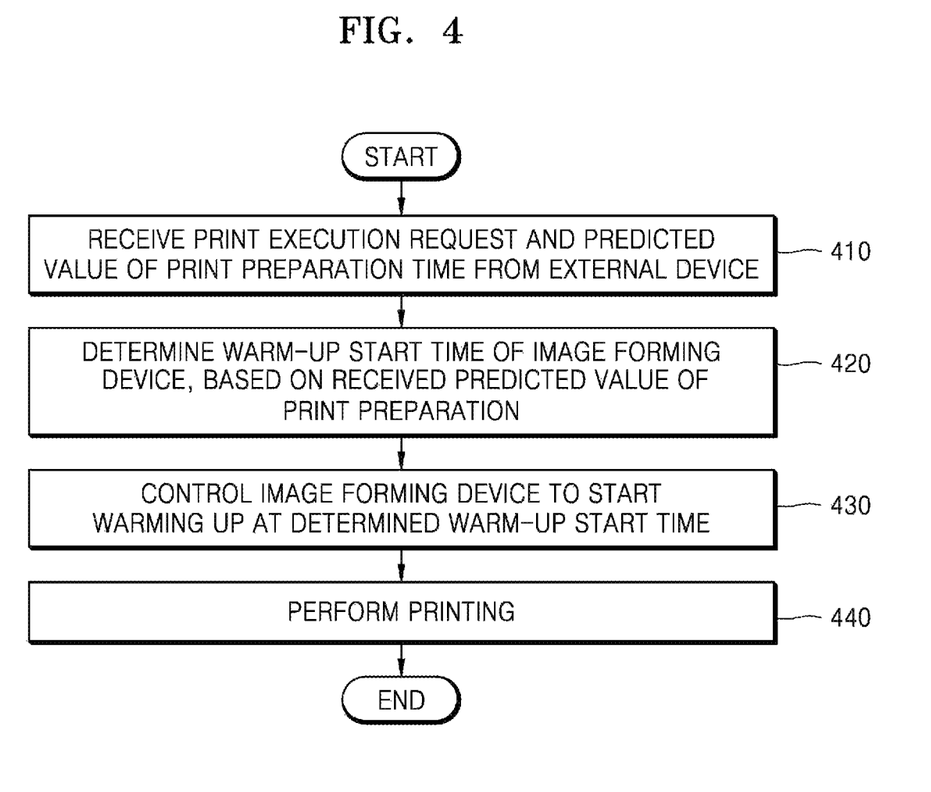
FIG. 4 is a flowchart of an operating method of an image forming device, according to an example.

FIG. 4 is a flowchart of an operating method of an image forming device, according to an example.

Operations of the method of FIG. 4 may be performed by the components of the image forming device 100 of FIG. 1. A description of parts of the method of FIG. 4 that are the same as those of FIG. 1 is omitted here.

In operation 410, the image forming device 100 may receive a print execution request and a predicted value of a print preparation time from the external device 200.

In one example, the print execution request may include an early warm-up command. When receiving the early warm-up command from the external device 200, the image forming device 100 may start warming up before preparation for printing is completed. In other words, the image forming device 100 may start warming up before creation of a first page of an output image of a current print job is completed.

In operation 420, the image forming device 100 may determine a warm-up start time thereof, based on the received predicted value of the print preparation time.

As used herein, the term "warm-up preparation time" may refer to a predicted time to complete warming up of an image forming device, starting from the warming up. The warm-up preparation time may be determined based on the type of the image forming device, an external environment, the manufacturing date of the image forming device, etc.

In one example, when a predicted value of a print preparation time of the current print job is greater than the warm-up preparation time, the image forming device 100 may determine the warming up of the image forming device 100 to be started after a time corresponding to a difference between the predicted value of the print preparation time and the warm-up preparation time. When the predicted value of the print preparation time of the current print job is less than the warm-up preparation time, the image forming device 100 may control warming up thereof to be started immediately.

In operation 430, the image forming device 100 may control warming up thereof to be started at the determined warm-up start time. In more detail, the warm-up start controller 124 of the image forming device 100 may control warming up of the image forming device 100 to be started at the determined warm-up start time.

In operation 440, when the warming up of the image forming device 100 and preparation for printing are completed, the image forming device 100 may perform printing.

Figure 5:
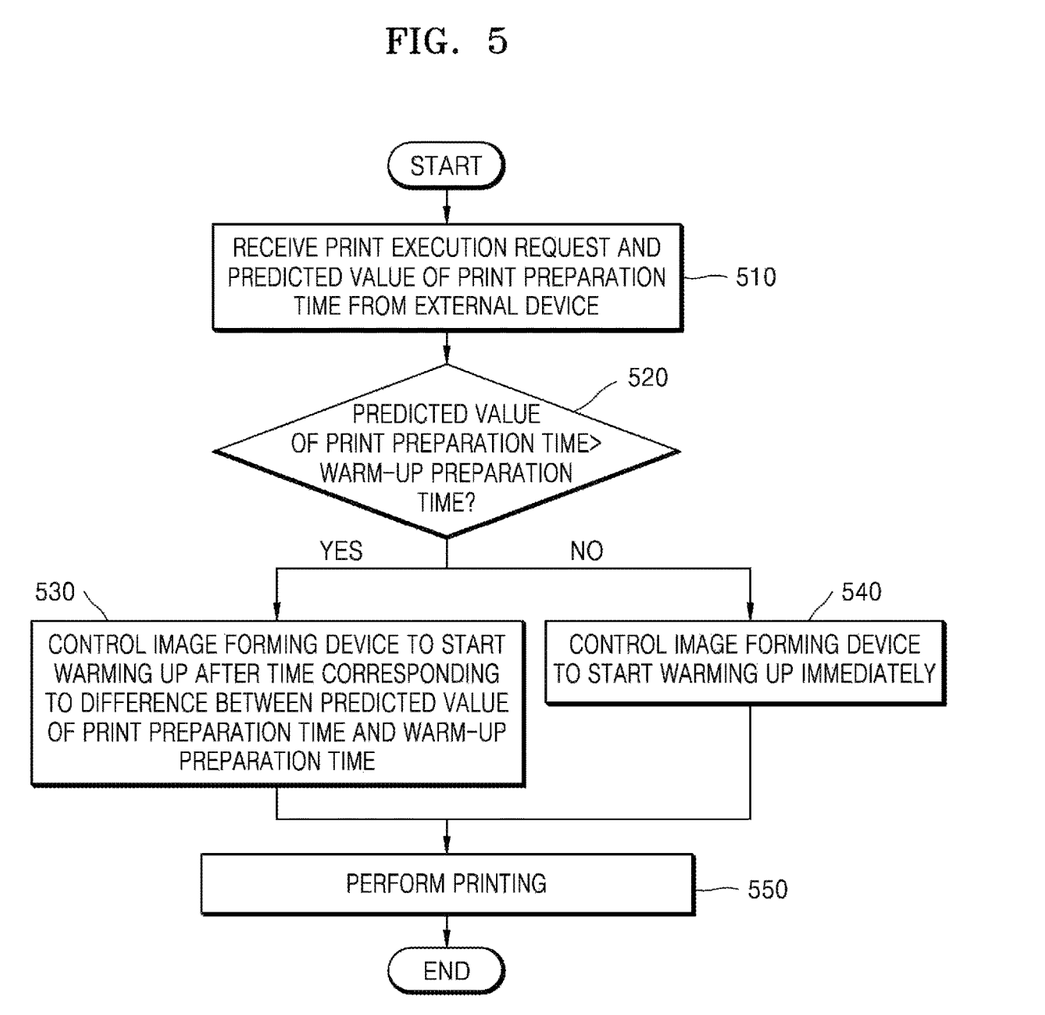
FIG. 5 is a detailed flowchart of an operating method of an image forming device, according to an example.

FIG. 5 is a detailed flowchart of an operating method of an image forming device, according to an example.

In operation 510, the image forming device 100 may receive a print execution request and a predicted value of a print preparation time from an external device.

In operation 520, the image forming device 100 may determine whether the predicted value of the print preparation time is greater than a warm-up preparation time.

In operation 530, when the predicted value of the print preparation time is greater than the warm-up preparation time, the image forming device 100 may control warming up to be started after a time corresponding to the difference between the predicted value of the print preparation time and the warm-up preparation time.

In operation 540, when the predicted value of the print preparation time is less than the warm-up preparation time, the image forming device 100 may control warming up to be started immediately.

In operation 550, when the warming up of the image forming device 100 and preparation for printing are completed, the image forming device 100 may perform printing.

Figure 6:
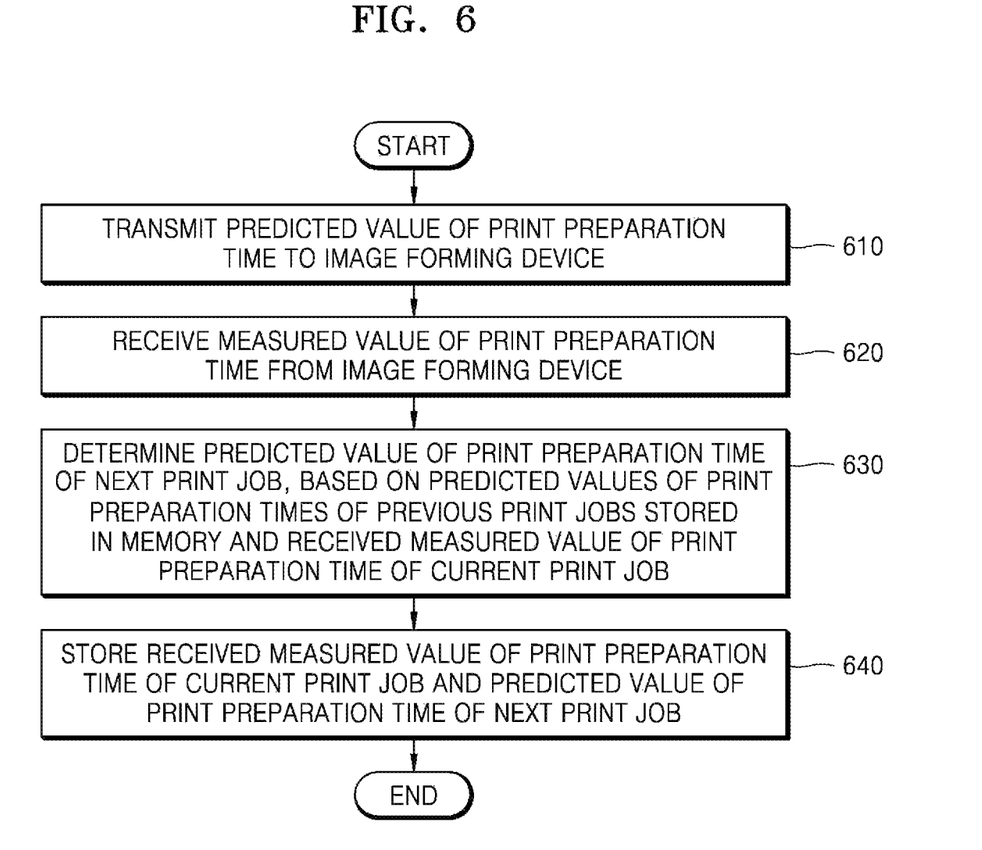
FIG. 6 is a flowchart of an operating method of an external device, according to an example.

FIG. 6 is a flowchart of an operating method of an external device, according to an example.

Operations of the method of FIG. 6 may be performed by the components of the external device 200 illustrated in FIG. 2. A description of parts of the method of FIG. 6 that are the same as those of FIG. 2 is omitted here.

In operation 610, the external device 200 may transmit a predicted value of a print preparation time to the image forming device 100.

In operation 620, the external device 200 may receive a measured value of the print preparation time from the image forming device 100. For example, the image forming device 100 may transmit the measured value of the print preparation time to the external device 200, in response to a query about the measured value of the print preparation time from the external device 200.

In operation 630, the external device 200 may determine a predicted value of a print preparation time of a next print job, based on measured values of print preparation times of previous print jobs stored in the memory 240 and the received measured value of the print preparation time of a current print job.

In one example, the external device 200 may determine at least one among an average of the received measured value of the print preparation time of the current print job and at least one of the measured values of the print preparation times of the previous print jobs stored in the memory 240, a mode thereof, and (average+mode)/2 to be the predicted value of the print preparation time of the next print job. The mode is a representative value of statistical data and may refer to a numerical value of a variable with a maximum frequency.

For example, when the received measured value of the print preparation time of the current print job is 5 and latest four values among the measured values of the print preparation times of the previous print jobs stored in the memory 240 are 4, 5, 6, and 5, the external device 200 may determine at least one among 5 that is an average of 5, 4, 5, 6, and 5, 5 that is a mode thereof, and 5 that is (average+mode)/2 to be the predicted value of the print preparation time of the next print job. In the present example, the average, the mode, and (average+mode)/2 are all 5 and thus 5 may be determined to be the predicted value of the print preparation time of the next print job.

In one example, the memory 240 may store a predetermined number of measured values of print preparation times of previous print jobs. For example, when the predetermined number of measured values of print preparation times of previous print jobs to be stored in the memory 240 is determined to be 20, the memory 240 may store latest twenty measured values and sequentially delete other measured values.

The memory 240 may permanently store the measured values of the print preparation times of the previous print jobs without deleting them.

In operation 640, the external device 200 may store the received measured value of the print preparation time of the current print job and the predicted value of the print preparation time of the next print job.

Figure 7:
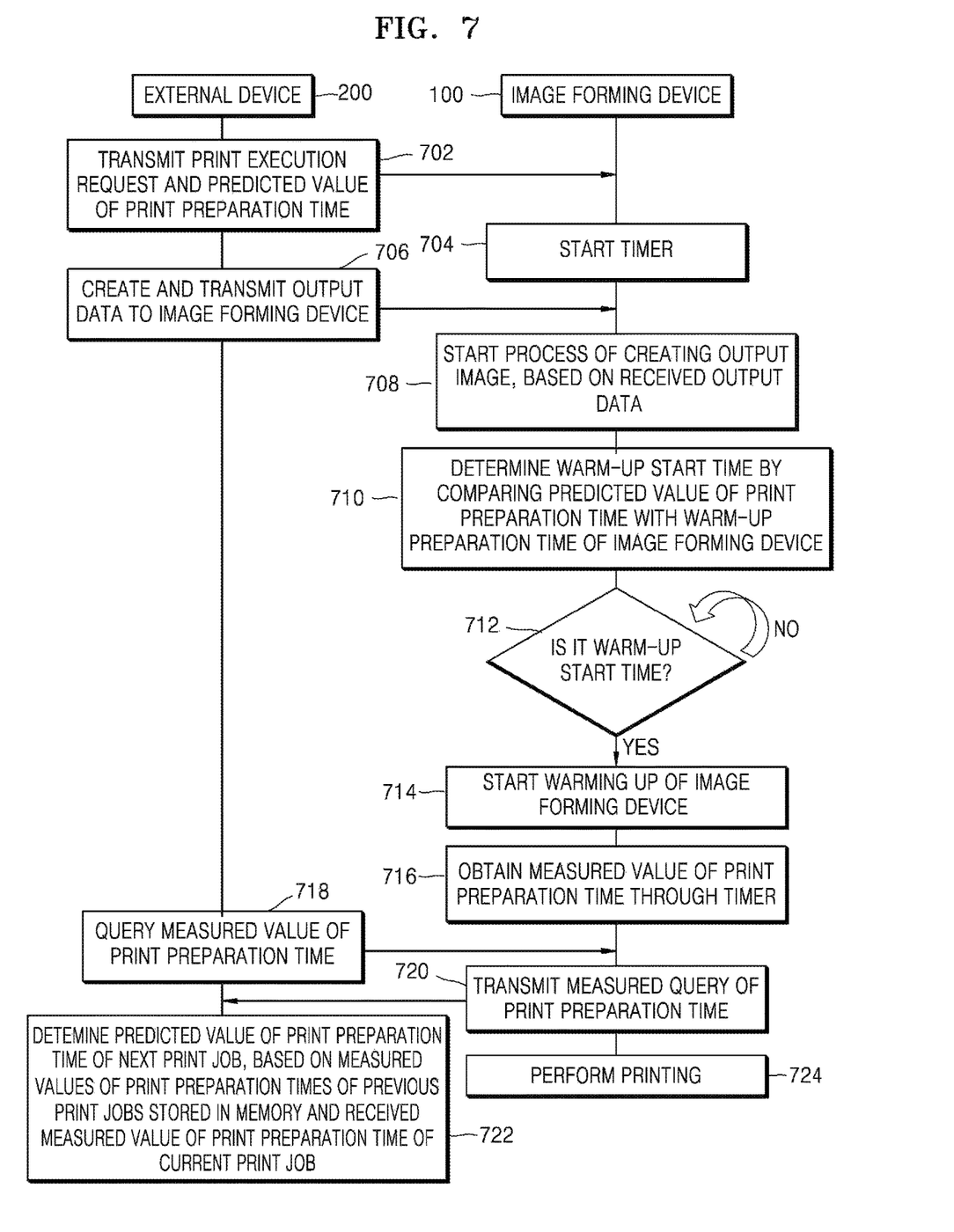
FIG. 7 is a flowchart of a process of determining a warm-up start time, performed by an image forming device, according to an example.

FIG. 7 is a flowchart of a process of determining a warm-up start time by an image forming device, according to an example.

In operation 702, the external device 200 may transmit a print execution request and a predicted value of a print preparation time to the image forming device 100.

In operation 704, an operation of the timer 126 may be started in response to the print execution request received by the image forming device 100.

In operation 706, the external device 200 may create output data and transmit the output data to the image forming device 100.

In operation 708, the image forming device 100 may start a process of creating an output image, based on the received output data.

In operation 710, the image forming device 100 may determine a warm-up start time by comparing the predicted value of the print preparation time with a warm-up preparation time of the image forming device 100.

In operation 712, the image forming device 100 may determine whether it is the warm-up start time. When it is not the warm-up start time, the image forming device 100 may stand by without starting warming up. In operation 714, when it is the warm-up start time, the image forming device 100 may control warming up to be started.

In operation 716, when preparation for printing is completed, the image forming device 100 may obtain a measured value of the print preparation time by using the timer 126.

In one example, the timer 126 may identify a time period until creation of a first page of the output image is completed after the print execution request is received from the external device 200. In other words, the timer 126 may obtain the measured value of the print preparation time.

In operation 718, the external device 200 may put a query about the measured value of the print preparation time to the image forming device 100.

In one example, the external device 200 may put a query about a set of measured values of the print preparation time to the image forming device 100. As used herein, "set of measured values of the print preparation time" may be a general term for measured values of the print preparation time stored in a current image forming device.

The external device 200 may put a query about a measured value of a print preparation time of a certain print job to the image forming device 100. For example, the external device 200 may put a query about a measured value of a print preparation time of a print job corresponding to a certain IP address and job ID to the image forming device 100.

In operation 720, the image forming device 100 may transmit the measured value of the print preparation time to the external device 200.

In one example, when the external device 200 queries the set of measured values of the print preparation time, the image forming device 100 may transmit the set of measured values of the print preparation time stored in the memory 140 to the external device 200. After the image forming device 100 transmits the set of measured values of the print preparation time to the external device 200, the memory 140 may delete the set of measured values of the print preparation time. Overload of the memory 140 may be prevented by deleting the set of measured values of the print preparation time transmitted to the external device 200.

In one example, the communication unit 230 may receive the set of measured values of the print preparation time. The controller 220 may obtain data related to a current print job by extracting this data from data included in the set of measured values of the print preparation time. The controller 220 may obtain data related to a certain print job by extracting this data from the data included in the set of measured values of the print preparation time. For example, the controller 220 may obtain data corresponding to certain job ID "11111117" by extracting this data from the data included in the set of measured values of the print preparation time.

When the external device 200 queries a measured value of a print preparation time of a certain print job, the image forming device 100 may transmit the measured value of the print preparation time of the print job stored in the memory 140 to the external device 200. After the image forming device 100 transmits the measured value of the print preparation time of the print job to the external device 200, the memory 140 may delete the measured value of the print preparation time of the print job.

In operation 722, the external device 200 may determine a predicted value of a print preparation time of a next print job, based on measured values of print preparation times of previous print jobs stored in the memory 240 and the received measured value of the print preparation time of the current print job.

In operation 724, the image forming device 100 may perform printing.

Figure 8:
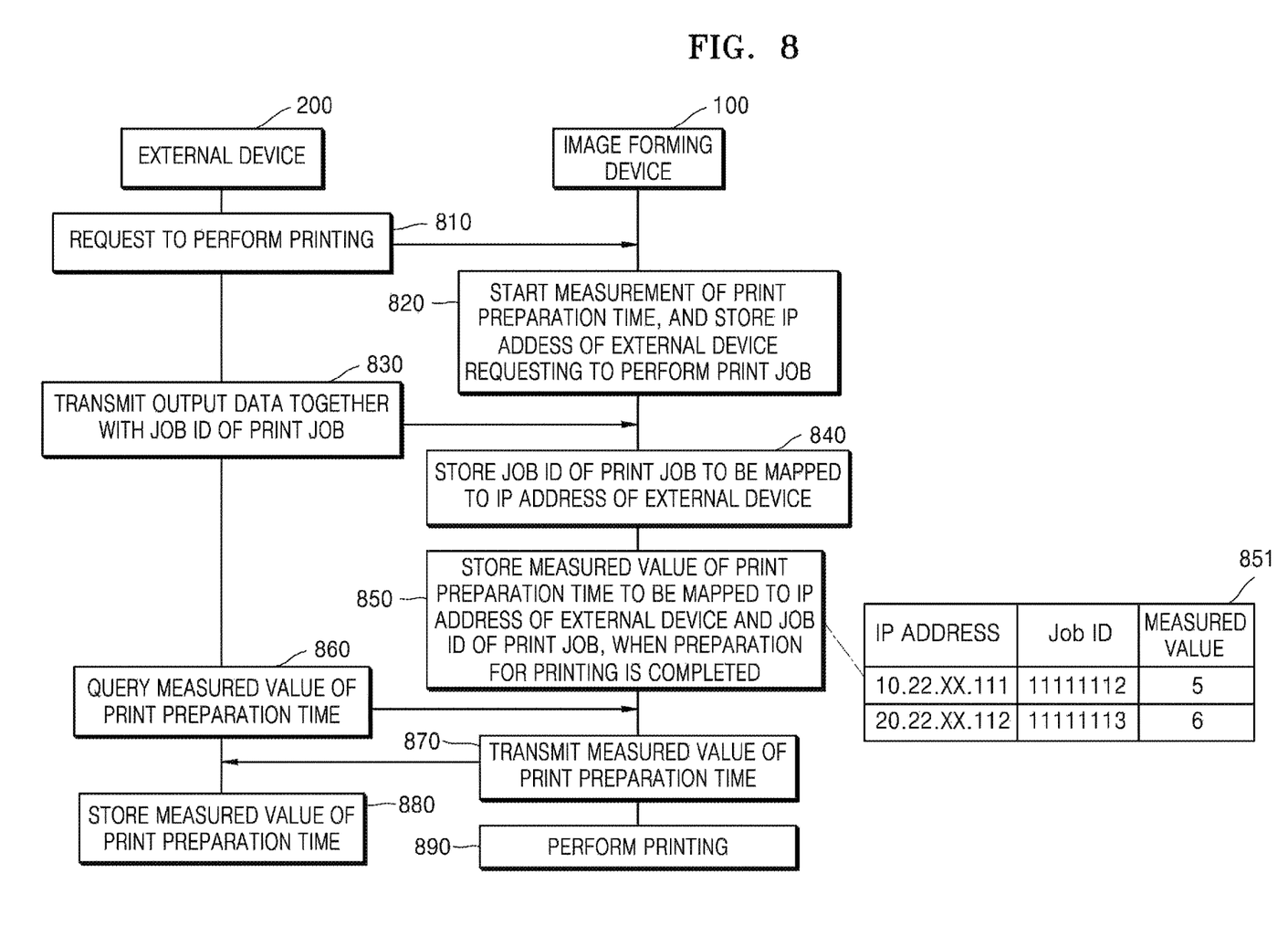
FIG. 8 is a flowchart of a process by which data is exchanged between an image forming device and an electronic device, according to an example.

FIG. 8 is a flowchart of a process of exchanging data between an image forming device and an electronic device, according to an example.

In operation 810, the external device 200 may request the image forming device 100 to perform printing. In detail, the communication unit 130 of the image forming device 100 may receive a print execution request from the external device 200.

In operation 820, the image forming device 100 may start the timer 126 to measure a print preparation time, and store an IP address of the external device 200 requesting to perform a print job, in response to the request to perform printing from the external device 200. In more detail, the timer 126 may start measurement of the print preparation time, and the memory 140 may store the IP address of the external device 200 requesting to perform the print job, in response to the print execution request received from the external device 200 via the communication unit 130.

In operation 830, the external device 200 may transmit output data together with job ID of the print job to the image forming device 100.

In operation 840, the image forming device 100 may store the job ID of the print job to be mapped to the IP address of the external device 200. For example, when job ID of a certain print job is 11111112 and the print job is started by an external device A, the image forming device 100 may store the job ID '11111112' to be mapped to an IP address '10.22.XX.111' of the external device A.

In operation 850, when preparation for printing is completed, the image forming device 100 may store a measured value of the print preparation time to be mapped to the IP address of the external device 200 and the job ID of the print job. Table 851 of FIG. 8 shows an example in which a measured value of a print preparation time is stored to be mapped to an IP address of an external device and ID of a print job. An IP address '10.22.XX.111', job ID '11111112' and a measured value '5' are mapped to one another. An IP address '20.22.XX.112', job ID '11111113', and a measured value '6' are mapped to one another. The memory 140 may store the mapped data.

In operation 860, the external device 200 may put a query about the measured value of the print preparation time print to the image forming device 100.

In operation 870, the image forming device 100 may transmit the measured value of the print preparation time to the external device 200.

In operation 880, the external device 200 may store the measured value of the print preparation time.

In operation 890, the image forming device 100 may perform printing.

Figure 9:
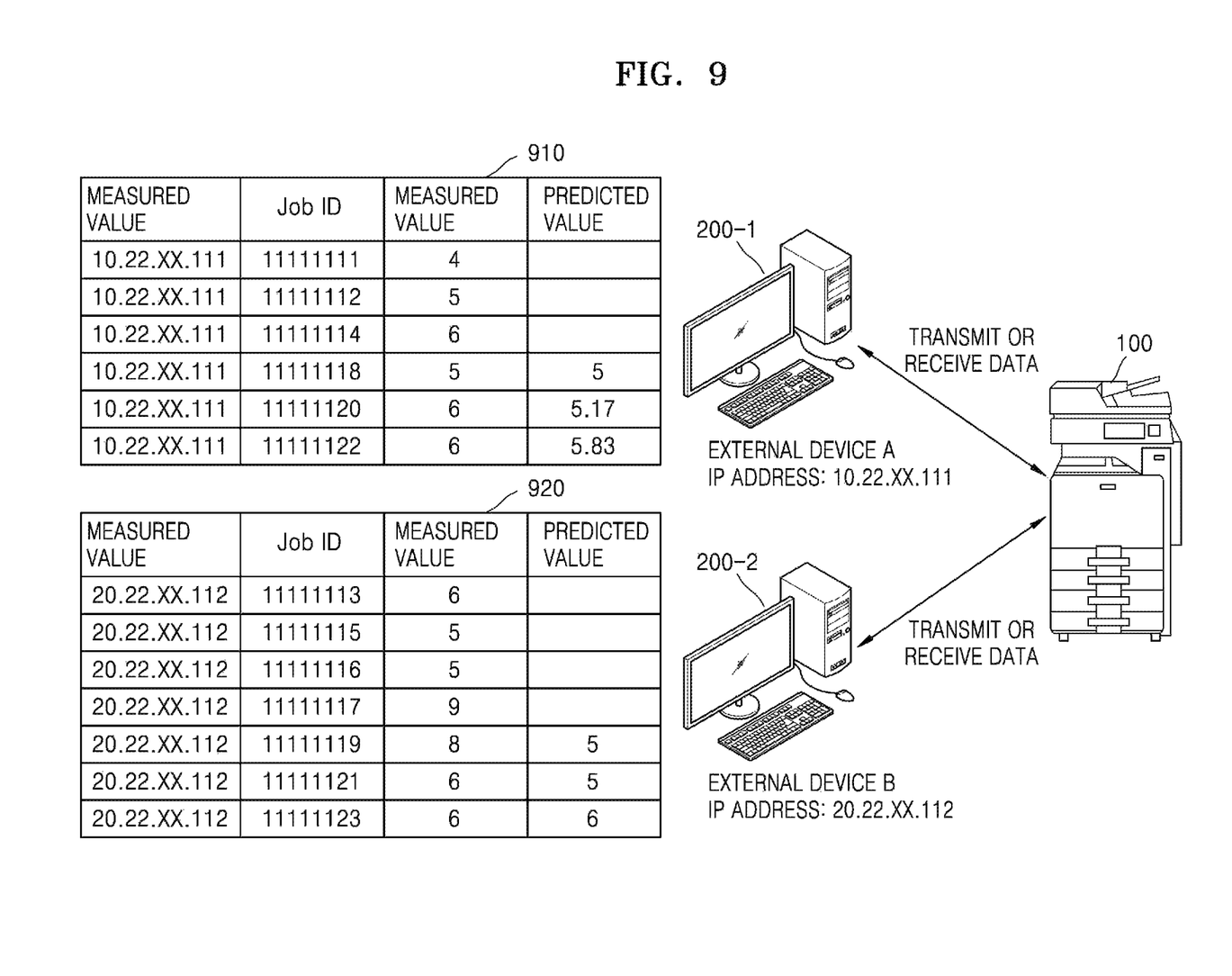
FIG. 9 is a diagram illustrating an example of determining a predicted value of a print preparation time of a next print job, based on measured values of print preparation times of previous and current print jobs, according to an example.

FIG. 9 is a diagram illustrating an example of determining a predicted value of a print preparation time of a next print job, based on measured values of print preparation times of previous and current print jobs, according to an example.

As illustrated in FIG. 9, an image forming device 100 may be operated by being connected to two or more external devices 200-1 and 200-2. The image forming device 100 may transmit data to or receive data from the external device A 200-1 and/or the external device B 200-2.

As shown in Tables 910 and 920 of FIG. 9, unique job ID may be assigned to each print job. However, IP addresses and Job IDs shown in the tables are merely examples and may be expressed in other various ways.

In one example, each of the external devices 200-1 and 200-2 may store data related to job ID mapped to the IP address thereof in the memory 240.

For example, referring to Table 910, data related to job IDs '11111111', '11111112', '11111114', '11111118', '11111120' and '11111122' mapped to an IP address '10.22.XX.111' of the external device A 200-1 is stored in the external device A 200-1. Referring to Table 920, data related to job IDs '11111113', '11111115', '11111116', '11111117', '11111119', '11111121' and '11111123' mapped to an IP address '20.22.XX.112' of the external device B 200-2 is stored in the external device B 200-2.

In one example, the external device 200 may determine a predicted value of a print preparation time of a next print job, based on half the sum of an average and a mode, i.e., (average+mode)/2, of the received measured value of the print preparation time of the current print job and at least one of measured values of print preparation times of previous print jobs stored in the memory 240. For example, the external device 200 may determine the predicted value of the print preparation time of the next print job, based on half the sum of a moving average and a moving mode, i.e., (moving average+moving mode)/2, of a plurality of measured values. Here, the term "moving average" or "moving mode" may refer to an average or a mode calculated based on a predetermined number of pieces of latest data.

For example, referring to Table 910 of FIG. 9, in the case of job ID '11111120', an average of measured values of print preparation times of previous three print jobs is 5.33 and a mode thereof is 5. Thus, the external device A 200-1 may determine a predicted value of the print preparation time of the print job with job ID '11111120' to be 5.33+5/2=5.17 (rounded to three decimal places).

In one example, the external device 200 may determine the predicted value of the print preparation time of the next print job, based on the average or the mode of the received measured value of the print preparation time of the current print job and at least one of measured values of print preparation times of previous print jobs stored in the memory 240. For example, the external device 200 may determine the predicted value of the print preparation time of the next print job, based on a moving mode or a moving average of a plurality of measured values.

For example, the external device B 200-2 of FIG. 9 may determine a predicted value of a print preparation time of a next print job, based on a mode. Referring to Table 920 of FIG. 9, in the case of job ID '11111121', a mode of measured values of print preparation times of previous four print jobs is 5 and thus the external device B 200-2 may determine a predicted value of a print preparation time of a print job with job ID '11111121' to be 5.

In one example, referring to Tables 910 and 920 of FIG. 9, a predicted value of a print preparation time of a next print job may be determined only when the number of the measured values of the print preparation times of the previous print jobs stored in the memory 240 of the external device 200 is greater than or equal to a predetermined reference number.

For example, Table 910 shows that a predicted value of a print preparation time of a next print job is determined after three or more measured values are accumulated, and Table 920 shows that a predicted value of a print preparation time of a next print job is determined after four or more measured values are accumulated. The "predetermined reference number" used as a reference value for determining whether the predicted value of the print preparation time of the next print job is to be determined may be reset by a user.

Figure 10:
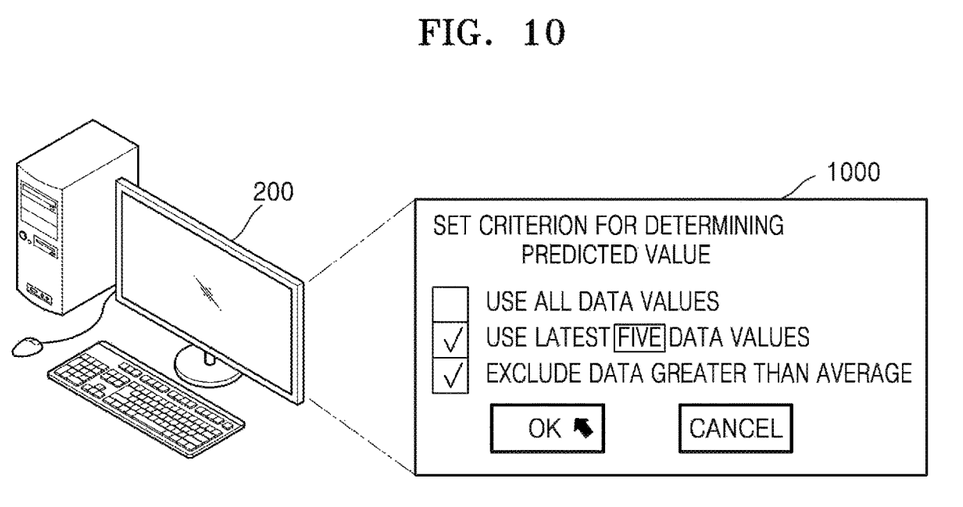
FIG. 10 is a diagram illustrating an example of a user interface screen of an external device according to an example.

FIG. 10 is a diagram illustrating an example of a user interface screen of an external device according to an example.

In one example, the input/output unit 210 of the external device 200 may provide a user interface. A user of the external device 200 may change various criteria for determining a predicted value of a print preparation time by using a user interface.

FIG. 10 illustrates an example of a user interface 1000 provided by the input/output unit 210 of the external device 200. A user may set a criterion for determining a predicted value of a print preparation time via the user interface. For example, the user may set, via the user interface 1000, whether all previous data values or only latest five data values are to be used to determine the predicted value of the print preparation time. The user may determine, via the user interface, whether data greater than an average is to be excluded or replaced with a predetermined maximum value (not shown).

A method of setting or changing a predicted value of a print preparation time by the external device 200 is not limited to using the user interface of FIG. 10, and may be performed by a method of arbitrarily setting or changing a criterion by the controller 220 of the external device 200.

As described above, an idle time of an image forming device may be minimized by minimizing the difference between a point of time when warming up of the image forming device is completed and a point of time when the image forming device completes creation of a first page of an output image. The foregoing description of the disclosure is intended to provide examples and it will be apparent to those of ordinary skill in the art that various changes may be easily made in the examples without departing from the technical idea and indispensable features of the disclosure. Therefore, the examples set forth herein should be considered in descriptive sense and not for purposes of limitation.

For example, each component described herein as a single entity may be distributed and implemented, and similarly, components described herein as being distributed may also be implemented in a combined form.

The scope of the disclosure should be defined by the appended claims, and differences or modifications derivable from the meaning and scope of the claims and equivalents thereto will be construed as falling within the scope of the disclosure.

The invention claimed is:

1. An image forming device comprising:
    a communication unit to transmit data to and receive data from an external device;
    an image forming job unit to perform printing; and
    a controller to control warming up of the image forming job unit to perform the printing, such that the image forming job unit performs the printing after the warming up is completed,
        wherein the controller is to
            receive a print execution request to perform the printing and a predicted value of a print preparation time for the image forming device to create output image data, to perform the printing, from the external device via the communication unit,
            determine a warm-up start time of when to start the warming up of the image forming job unit, by using the received predicted value of the print preparation time, and
            control the image forming job unit to start the warming up at the determined warm-up start time.

2. The image forming device of claim 1, wherein the controller is to
    control the image forming job unit to start the warming up when the predicted value of the print preparation time is less than a warm-up preparation time to complete the warming up of the image forming job unit, and
    control the image forming job unit to start the warming up after a time period corresponding to a difference between the predicted value of the print preparation time and the warm-up preparation time, when the predicted value of the print preparation time is greater than the warm-up preparation time of the image forming job unit.

3. The image forming device of claim 1, wherein the controller is to create the output image data, based on output data received from the external device via the communication unit.

4. The image forming device of claim 3, wherein the controller is to obtain a measured value of the print preparation time, by measuring time to create the output image data, and
    the image forming device further comprises a memory to store the measured value of the print preparation time.

5. The image forming device of claim 4, wherein the communication unit is to transmit the measured value of the print preparation time to the external device, in response to a query from the external device, and
    the controller is to delete the measured value of the print preparation time from the memory after the communication unit transmits the measured value of the print preparation time to the external device.

6. An electronic device to operate in connection with an image forming device, the electronic device comprising:
    a memory to store data;
    a communication unit to:

transmit a first predicted value of a first print preparation time for the image forming device to create output image data of a first print job to the image forming device, and receive a measured value of the first print preparation time of the first print job from the image forming device; and a controller to determine a second predicted value of a second print preparation time for the image forming device to create output image data of a second print job, based on measured values of print preparation times of previous print jobs previous to the first print job, which are stored in the memory, and the received measured value of the first print preparation time of the first print job, wherein the memory is to store the received measured value of the first print preparation time of the first print job and the second predicted value of the second print preparation time of the second print job.

7. The electronic device of claim 6, wherein the controller is to create output data of the first print job, and
the communication unit is to transmit the output data to the image forming device.

8. The electronic device of claim 7, wherein the controller is to query the image forming device, to receive the measured value of the first print preparation time of the first print job.

9. The electronic device of claim 6, wherein, to determine the predicted value of the second print preparation time of the second print job, the controller is to use at least one of:
an average of the received measured value of the first print preparation time of the first print job and at least one of the measured values of the print preparation times of the previous print jobs stored in the memory,
a mode of the received measured value of the first print preparation time of the first print job and at least one of the measured values of the print preparation times of the previous print jobs stored in the memory, or
an average value of the average and the mode ((the average+the mode)/2).

10. The electronic device of claim 6, wherein the controller is to determine the predicted value of the second print preparation time of the second print job, when a number of the measured values of the print preparation times of the previous print jobs stored in the memory is greater than or equal to a predetermined reference number.

11. A method comprising:
receiving a print execution request requesting an image forming device to perform printing and a predicted value of a print preparation time for the image forming device to create output image data, to perform the printing, from an external device;
determining a warm-up start time of when to start warming up of an image forming job unit of the image forming device to perform the printing, by using the received predicted value of the print preparation time;
controlling the image forming job unit to start the warming up at the determined warm-up start time; and
performing the printing when the warming up is completed, based on the print execution request.

12. The method of claim 11, wherein the controlling of the image forming job forming unit to start the warming up comprises:
when the predicted value of the print preparation time is less than a warm-up preparation time to complete the warming up, controlling the image forming job unit to start the warming up; and
when the predicted value of the print preparation time is greater than the warm-up preparation time, controlling the image forming job forming unit to start warming up after a time period corresponding to a difference between the predicted value of the print preparation time and the warm-up preparation time.

13. The method of claim 11, further comprising:
receiving output data from the external device; and
creating an output image data, based on the output data.

14. The method of claim 13, further comprising:
obtaining a measured value of the print preparation time by measuring time for creating the output image data; and
storing the measured value of the print preparation time.

15. A method by an electronic device to operate in connection with an image forming device, the method comprising:
transmitting a first predicted value of a first print preparation time for the image forming device to create output image data of a first print job, to the image forming device;
receiving a measured value of the first print preparation time of the first print job from the image forming device;
determining a second predicted value of a second print preparation time for the image forming device to create output image data of a second print job, based on predicted values of print preparation times of previous print jobs previous to the first print job, which are stored in a memory, and the received measured value of the first print preparation time to complete the first print job; and
storing the received the measured value of the first print preparation time of the first print job and the second predicted value of the second print preparation time of the second print job.

* * * * *